United States Patent [19]
Matsui

[11] Patent Number: 6,028,734
[45] Date of Patent: Feb. 22, 2000

[54] CASSETTE DISPLAY VIEWER DEVICE

[75] Inventor: Akira Matsui, Saitama-ken, Japan

[73] Assignee: Kabushiki Kaisha Toshiba, Kawasaki, Japan

[21] Appl. No.: 09/016,808

[22] Filed: Jan. 30, 1998

Related U.S. Application Data

[63] Continuation of application No. PCT/JP97/01131, Apr. 2, 1997.

[30]     Foreign Application Priority Data

Apr. 3, 1996 [JP] Japan .................................. 8-081669

[51] Int. Cl.⁷ ..................................................... G11B 15/00
[52] U.S. Cl. .............................................................. 360/96.5
[58] Field of Search ................................ 360/96.5, 96.6, 360/93, 85; 369/77.1, 77.2

[56]                 References Cited

U.S. PATENT DOCUMENTS

| 4,673,994 | 6/1987 | Hida .......................................... 360/93 |
| 5,408,459 | 4/1995 | Kawaguchi et al. .................... 369/77.2 |
| 5,815,479 | 9/1998 | Lee ........................................ 369/77.2 |

FOREIGN PATENT DOCUMENTS

| 0 504 859 | 9/1992 | European Pat. Off. . |
| 0 578 536 | 1/1994 | European Pat. Off. . |
| 4-16317 | 4/1992 | Japan . |
| 2 155 232 | 9/1985 | United Kingdom . |

OTHER PUBLICATIONS

Patent Abstracts of Japan, vol. 017, No. 619 (P–1644), Nov. 15, 1993 & JP 05 189947 A (Ricoh Co Ltd), Jul. 30, 1993.

*Primary Examiner*—Allen T. Cao
*Attorney, Agent, or Firm*—Pillsbury Madison & Sutro LLP

[57]                 ABSTRACT

A cassette guiding member 20a of a cassette inserting slot 37 is provided with a slope 24 as a notch to enable viewing a label on the cassette when the cassette is loaded into the product. A first cassette door 50 is rotatably mounted to the cassette inserting slot 37 and is provided with a transparent part 50a to enable viewing of the cassette back label 11 via the above slope 24. In addition, a second cassette door 51 is rotatably mounted at the back of the first cassette door 50. The second cassette door 51 opens in association with the first cassette door 50 by engaging with it and bears a display mark 51a related to the product on the surface. Thus, the label 11 on the cassette can be seen easily through the transparent part 50a without pressing or opening the first cassette door 50 even after cassette loading, and the external light is obstructed by the second cassette door 51 for stable product performance. Viewing capability of the display mark 51a via the transparent part 50a even when the cassette is loaded improves the function and achieves optimum product appearance.

10 Claims, 6 Drawing Sheets

CASSETTE DISPLAY VIEWER DEVICE

This is a Continuation of: International Appln. No. PCT/JP97/01131 filed Apr. 2, 1997 which designated the U.S.

BACKGROUND OF THE INVENTION

1. Field of the Invention

The present invention relates to a cassette display viewer device preferably to be used for recognition of the cassette display when a cassette storing a recording medium is loaded in various electronic products including video and audio appliances.

2. Description of the Related Art

Some conventional electronic products including video and audio appliances use a cassette storing a recording medium such as a tape so as to record or reproduce various data. Such a cassette can be loaded into and unloaded from the applicable electronic product.

Referring to FIG. 7 showing the case of a video cassette tape recorder (hereinafter referred to as "VTR") 20, for example, a cassette 10 storing a tape record medium is inserted into a cassette inserting slot 37 provided at the front panel of the VTR 20 so that the cassette 10 is loaded into the VTR 20 (usually referred to as "cassette loading"). The cassette inserting slot 37 is provided with a cassette door 25 rotatable around the top end. To insert a cassette, the user presses and opens the cassette door 25 with the front end of the cassette 10.

In this process, the cassette 10 is, as shown in FIG. 8, inserted into the cassette inserting slot 37 from the side of a lid 10a with the back side bearing a label 11 directed toward the user, and guided by a cassette guiding member 20a formed at the lower part of the cassette inserting slot 37 to be accepted by a cassette holder (not shown). After accepting the cassette, the cassette holder is driven in a horizontal direction to transfer the cassette 10 to above a predetermined position, that is, above the reel base. Then, it is driven to go down vertically to place the cassette 10 on the reel base in the housing. For ejection, it raises the cassette vertically and transfers it horizontally via the cassette inserting slot 37 to a position where the user can pull out the cassette.

To support cassette insertion to the cassette holder and the above operations of the cassette holder, the cassette guiding member 20a is formed to have a substantially level surface on the top and to have both the ends of the cassette transfer direction chamfered and to have a vertical face 20b for the side facing inside of the housing. The chamfered part of the side near the user serves as a cassette inserting guide section 21 and the chamfered part inside the housing serves as a cassette ejecting guide section 23. They are designed so that the cassette holder goes up and down in the space inside the housing parted by the vertical face 20b of the housing.

FIGS. 9(a) and 9(b) show the positional relation between the cassette guiding member 20a of the VTR and the cassette 10 upon completion of cassette 10 transfer to the reel base. FIG. 9(a) is a plan view and FIG. 9(b) is a cross sectional view along the line A—A in FIG. 9(a). As shown in the figures, the face bearing the label 11 of the cassette 10 is opposite the inner vertical face 20b of the cassette guiding member 20a.

The user desires to quickly check the contents of the actually loaded cassette 10 before operating the VTR 20 for the object operation. Suppose a cassette 10 which is kept loaded for a long time without being used, for example. The user often forgets what kind of programs are recorded on the cassette 10. When the user wants to record a new program, it is necessary to check whether the data in the loaded cassette can be overwritten with the program. For this purpose, the user may play the cassette to verify the contents. If the user can check the description on the label 11 of the cassette 10, the contents can be checked quite easily in a short time.

However, the cassette 10 loaded in the VTR 20 has its label 11 opposite the inner vertical face 20b of the cassette guiding member 20a as described above. Therefore, as shown in FIG. 10, even if the user opens the cassette door 25 and looks inside of the VTR 20, the cassette guiding member 20a obstructs the user's view to the label 11.

To enable viewing the label 11 with the cassette 10 kept loaded in the VTR 20, it is sufficient to partially remove the obstructive cassette guiding member 20a in the area where such removal does not spoil its essential function. In addition, forming the cassette door 25 with a transparent material eliminates the need to open the door to see the label.

However, if the cassette door 25 is transparent, the mechanism inside of the VTR 20 is always seen via the cassette door 25 and it is not favorable from the viewpoint of product design.

As described above, there has been a problem with the construction which enables viewing of the label on the loaded cassette through the cassette door, which results in that the mechanism in the housing is seen, and which is not favorable from the viewpoint of product design.

Therefore, it is an object of the present invention to provide a cassette display viewer device which allows the user to see the cassette label even after cassette loading but prevents the user from looking into the internal mechanism of the product as far as possible so as to improve the product design.

SUMMARY OF THE INVENTION

According to the first invention, a cassette display viewer device comprises:

a cassette bearing a label on one side;

a housing having a cassette inserting slot and accommodating the cassette inserted via the cassette inserting slot at a predetermined position inside;

a first cassette door provided at the cassette inserting slot which is at least partially formed with a transparent member and designed to open when the cassette is inserted and to close to cover the cassette inserting slot when the cassette is or is not contained inside of the housing and constructed to enable viewing of the label on the cassette through the transparent member part when the cassette is contained in the housing; and a second cassette door located at the back side of the first cassette door on an inside of the housing and which is formed with an opaque member and designed to open together with the first cassette door when the cassette is inserted, to open up to a position in which the label on the cassette can be viewed through the transparent part of the first cassette door when the cassette is at the predetermined position in the housing, and to be opposite at least to the transparent part of the first cassette door when the cassette is not in the housing.

With the first invention, the user can easily see the label of the back of the loaded cassette through the transparent part without pressing or opening the first cassette door to check and understand the contents of the cassette after the cassette is loaded to the predetermined position in the housing. In addition, the second cassette door opens in association with the first cassette door in the cassette insertion process to assure the cassette insertion transfer route. Besides, the second cassette door is made of an opaque member and, when the cassette is not loaded in the housing, the inner portion of the housing is not seen, whereby to provide a favorable appearance of the design.

According to the second invention, a cassette display viewer device comprises:

- a cassette bearing a label on one side;
- an inserting slot for the cassette provided at the product housing;
- a cassette holder provided in the housing which accepts the cassette inserted via the cassette inserting slot with its face bearing the label faced toward the cassette inserting slot at a first position, moves horizontally and then goes down vertically to transfer the accepted cassette to a second position, that is, the predetermined position in the housing, and which rises vertically from the second position, moves horizontally and transfers the cassette to the first position;
- a guiding member provided between the cassette inserting slot and the cassette holder in the housing to guide the cassette to be inserted into the cassette holder at the first position having a notch so as to expose the label face of the cassette to the cassette inserting slot when the cassette holder containing the cassette is at the second position;
- a first cassette door provided at the cassette inserting slot which is at least partially formed with a transparent member and designed to open when the cassette is inserted and to close to cover the cassette inserting slot when the cassette is or is not contained inside of the housing and thus constructed to enable viewing of the label on the cassette through the transparent member part when the cassette holder containing the cassette is at a second position; and
- a second cassette door located at the back side of the first cassette door on an inside of the housing which is formed with an opaque member and designed to open together with the first cassette door when the cassette is inserted, to open up to a position in which the label on the cassette can be viewed through the transparent part of the first cassette door when the cassette holder containing the cassette is at the second position, and to be opposite at least to the transparent part of the first cassette door when the cassette is not in the housing.

With the second invention, which can be applied to a VTR, for example, the guiding member placed near the cassette inserting slot inside the housing for easily moving the cassette with the cassette holder from a first position, which is an initial position, to a second position, that is, a position in which the cassette is loaded and for easily ejecting it reversely from the second position to the first position is provided with a notch and the label face of the loaded cassette is exposed to the cassette inserting slot when the cassette holder containing the cassette is at the second position.

After loading of the VTR cassette to the second position in the housing, the user can easily see the label on the loaded cassette through the transparent part without opening the first cassette door to check and understand the contents of the loaded cassette. In addition, the second cassette door opens along with the first cassette door in the cassette insertion process to assure the cassette insertion transfer route. Besides, the second cassette door is made of an opaque member and, when the cassette is not loaded in the housing, the inner portion of the housing is not seen, whereby to provide a favorable appearance of the design.

According to the third invention, a cassette display viewer device is characterized in that the second cassette door in the second invention above is designed to be in contact with the top of the cassette when the cassette holder containing the cassette is at the second position in the housing.

With the third invention, even when the cassette is loaded in the housing, the second opaque cassette door in contact with the top of the cassette covers the space above the cassette, so that the inner portion of the housing is not seen, whereby to provide a favorable appearance of the design. Further, the second cassette door is designed to be closed and opened in association with the lowering and rising operations of the cassette in cassette insertion and ejection. The second cassette door does not need any special component such as a door opening/closing lever for opening and closing and does not increase the number of components.

According to the fourth invention, a cassette display viewer device is characterized in that the second cassette door according to the first or second invention is bearing the display or indication related to the product on its face opposite the first cassette door.

With the fourth invention to provide display or indication related to the product such as the manufacturer or model name on the surface of the second cassette door, the user can view such display through the transparent part of the first cassette door and, particularly when no cassette is in the housing, the display appears in the cassette inserting slot so that the user can check the model or other information. It also improves the housing design appearance.

According to the fifth invention, a cassette display viewer device is characterized in that the second cassette door is bearing the display with symbols or marks on its face opposite the first cassette door.

With the fifth invention to display symbols or marks on the surface of the second cassette door, the user can view such display through the transparent part of the first cassette door and, particularly when no cassette is in the housing, symbols and marks appear in the cassette inserting slot serving for checking and guiding in cassette insertion. It also improves the housing design appearance.

According to the sixth invention, a cassette display viewer device is characterized in that the transparent part area of the first cassette door under the first or second invention is formed corresponding to the label application area on the cassette.

With the sixth invention, the label area of the loaded cassette can be entirely seen through the transparent part of the first cassette door when the cassette is loaded at a predetermined position in the housing.

According to the seventh invention, a cassette display viewer device is characterized in that the notch in the guiding member under the second invention is formed to be a slope going down toward inside of the housing.

With the seventh invention, the label on the cassette loaded in the housing can be easily seen. In addition, the sloped notch shows a face going down to the back of the cassette even when the user looks into the inside from the cassette inserting slot and this achieves a better appearance than a simple notch from the viewpoint of design.

DETAILED DESCRIPTION OF THE INVENTION

Referring to the attached figures, preferred embodiments are described below.

Figure 1:
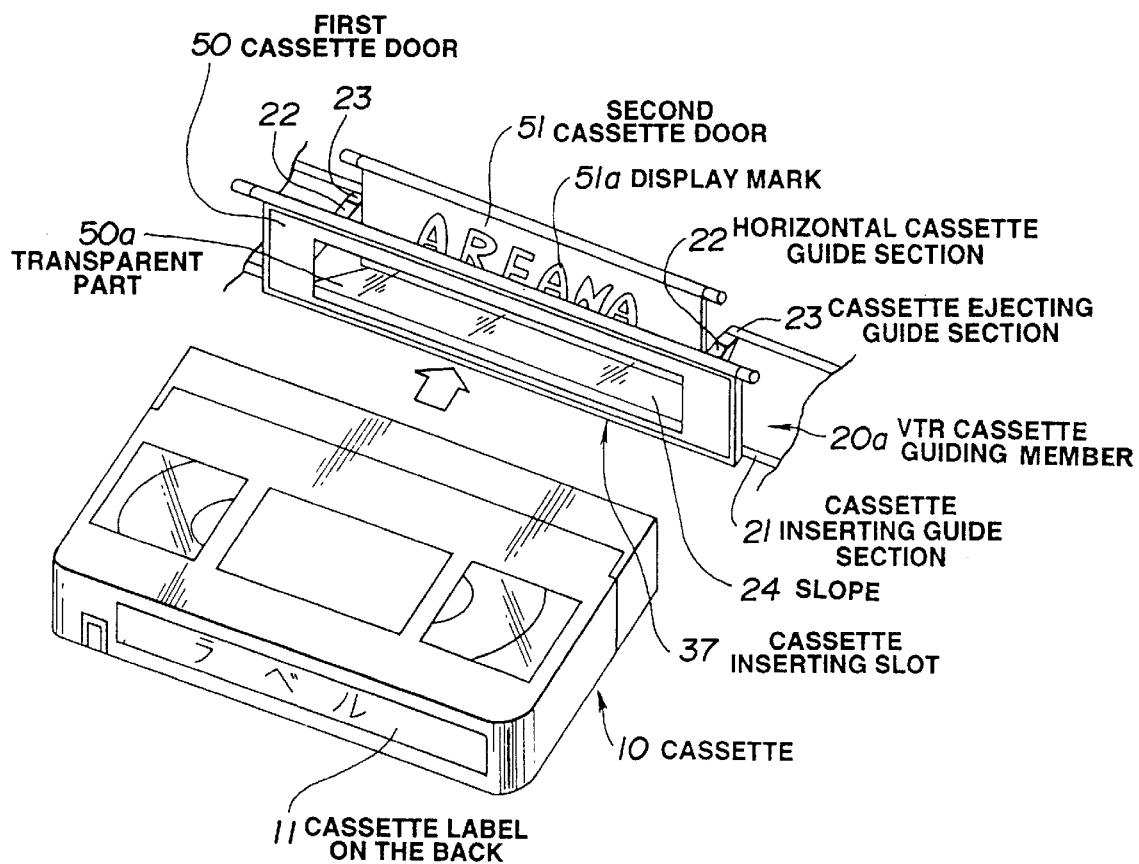
FIG. 1 is a perspective view to show an embodiment of a cassette display viewer device according to the present invention.
Figure 8:
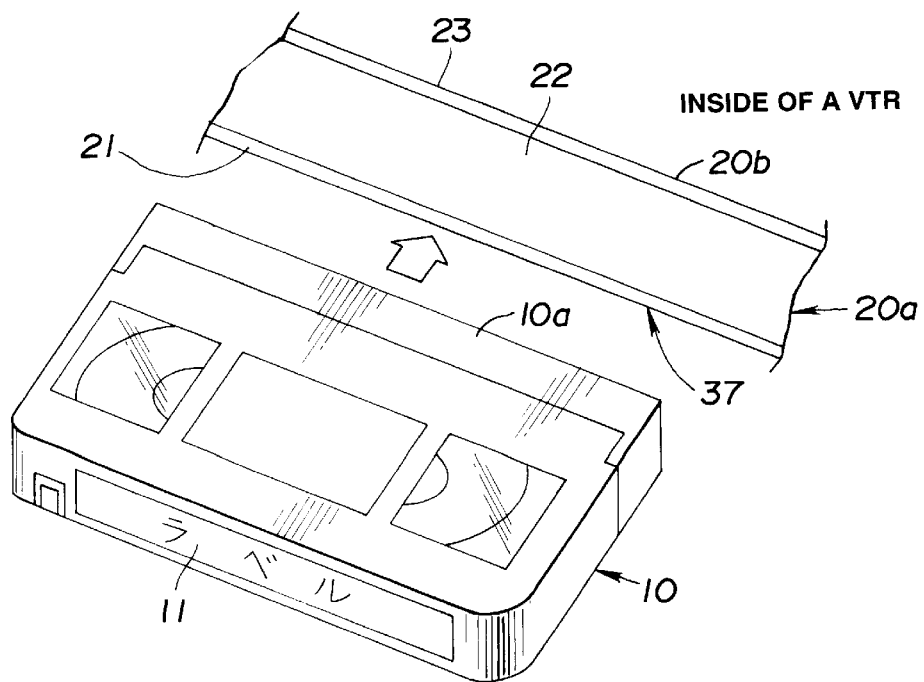
FIG. 8 is an explanatory view to illustrate the cassette guiding member used in a conventional VTR.
Figure 9A:
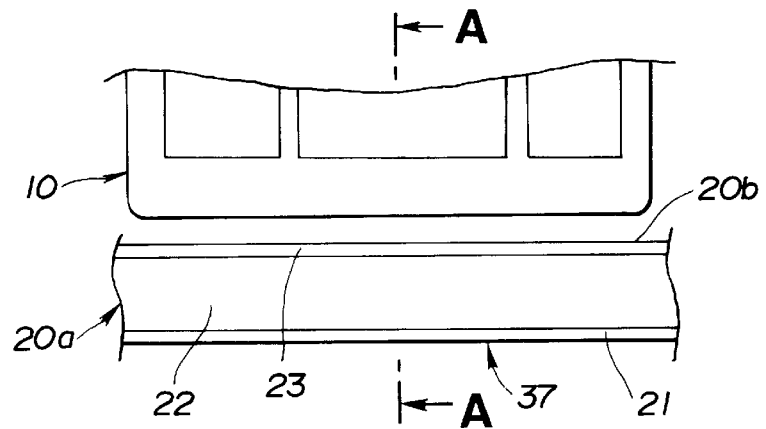
FIG. 9(a) is a plan view to show the status after cassette loading in a conventional VTR.
Figure 9B:
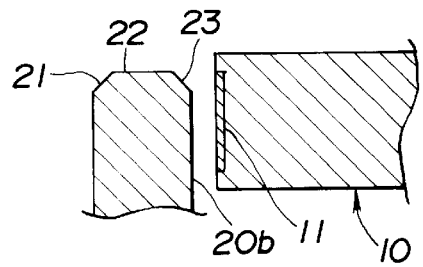
FIG. 9(b) is a cross sectional view along the line A—A of FIG. 9(a).
Figure 10:
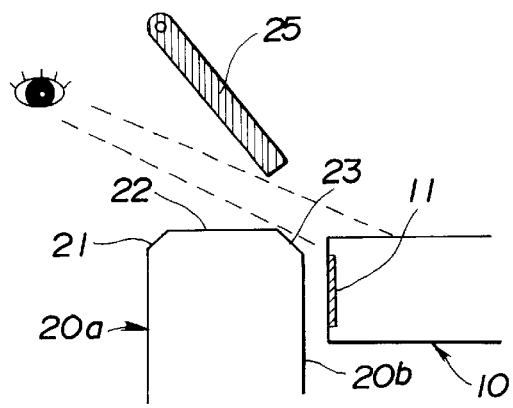
FIG. 10 is a cross sectional view to show an example of a conventional cassette display viewer device.

FIG. 1 is a perspective view to illustrate an embodiment of a cassette display viewer device according to the present invention and shows the cassette display viewer before cassette insertion. In the figure, the same constituent elements as those in FIG. I have the same reference numerals as in FIG. 8.

As shown in FIG. 1, a cassette 10 has a label 11 on the back and, on the end opposite to the back, has a lid 10a which opens to allow pulling out of a magnetic tape contained inside when it is loaded into a VTR 20.

The VTR 20 as an electronic product has, at the facade of its housing, a cassette inserting slot 37 to which the cassette is inserted. On the upper part of the cassette inserting slot 37 inside of the housing, a first and second cassette doors 50 and 51 are rotatably mounted at front and back positions in the cassette insertion direction so that they open and close the cassette inserting slot by rotating around their top ends.

On the lower part of the cassette inserting slot 37, a cassette guiding member 20a is mounted to guide the insertion of the cassette 10 toward the inside of the housing and the taking out of the cassette from the inside of the housing.

The cassette 10 is inserted with its lid 10a pressing and opening the cassette doors 50 and 51 in this order. At this point, the cassette 10 has its bottom face guided by a cassette horizontal guide section 21 of the cassette guiding member 20a, is accepted by a cassette holder to be described later, and is loaded by the cassette holder onto the reel base, which is a predetermined position in the VTR.

The cassette guiding member 20a is provided with a pair of left and right cassette horizontal guide sections 22, which is formed horizontally. Both its ends in the cassette insertion direction are chamfered to form cassette inserting guide sections 21 and cassette ejecting guide sections 23. The cassette horizontal guide sections 22 are formed to slightly project from the plane level so as to reduce the contact area with the bottom of the cassette 10.

The cassette inserting guide section 21 guides the cassette 10 when it is inserted so that its bottom runs onto the cassette horizontal guide sections 22 and the cassette ejecting guide sections 23 guides the cassette 10 when it is ejected so that its bottom runs onto the cassette horizontal guide sections 22.

The cassette guiding member 20a is further provided, in the middle of its longitudinal direction, with a notch, which is provided with a slope 24 having a surface going down toward the inside so that the user can view the label 11 of the cassette 10 from the cassette inserting slot 37.

The slope 24 is formed by cutting the member substantially at the center of the cassette guiding member 20a provided near the front panel of the VTR 20 so as to make a sloped face going down to inside of the VTR 20 from the cassette inserting slot 37 whose cross section is sloped. The length of the slope 24 corresponding to the cassette width direction is, for example, shorter than the cassette width and corresponds to the area of label application on the cassette 10. In this case, by providing the slope 24 symmetrically around the center of the cassette width direction, its length can correspond to the character section in the length of the label application area on the cassette 10. This provides a favorable appearance to the cassette guiding member 20a.

The length of the slope 24 for the cassette width direction is designed shorter than the width of the cassette 10, and the interval between the left and right cassette horizontal guide sections 22 assures the length required to guide the right and left ends of the cassette 10 when the cassette is inserted. Thus, the mechanical strength of the cassette guiding member 20a is also assured.

With the slope 24 of the cassette guiding member 20a constructed as described above, the label 11 on the loaded cassette 10 can be viewed. To enable such viewing through the cassette door 50, the cassette door 50 is provided with a transparent part 50a as a part of the door and the other parts are opaque. In addition, at the back of this cassette door 50, another cassette door 51 is provided. When the cassette door 50 is not serving for its essential function to enable viewing of the cassette label from outside, i.e. when any cassette is not loaded, the cassette door 51 covers the transparent part 50a and closes the slope 24 or the notch to protect the internal mechanism of the VTR 20 from being seen from outside.

The transparent part 50a provided at the first cassette door 50 is, for example, disposed in the area where the cassette label 11 can be seen after cassette loading. Specifically, the length in the horizontal direction and the width in the vertical direction of the transparent part 50a are arranged corresponding to the length and width of the label application area on the cassette 10. Thus, by providing the transparent part 50a only for the predetermined area on the first cassette door 50, the necessary part on the cassette 10, that is, the cassette label 11 only can be seen after cassette loading, for example, which results in a visually favorable impression.

The first cassette door 50 is rotatably attached by an axis near the inner part of the cassette inserting slot 37 of the housing. The first cassette door 50 is, though not shown, engaged with a door opening/closing lever working in association with the cassette holder. As the cassette holder moves in the cassette ejection process, the door is driven by the door opening/closing lever so that it opens toward inside of the housing. Further, in the cassette insertion process, the engagement with the door opening/closing lever is released and the cassette door 50 is pressed and opened by the side end of the lid 10a on the cassette 10.

On the other hand, when the first cassette door 50 rotates in the cassette insertion process, the second cassette door 51 disposed at further into the housing than the first cassette door comes into contact with the first cassette door and is opened by its pressing. When the cassette is ejected, the second cassette door 51 similarly opens upon contact with the first cassette door 50 driven by the door's opening/closing lever. In other words, the second cassette door 51 is constructed so that it opens in association with the first cassette door 50.

The door width of the second cassette door 51 is at least the same as the width of the transparent part 50a of the first cassette door 50. The length of the second cassette door 51 corresponding to the cassette width direction is designed to be long enough to seal the slope 24 of the cassette guiding member 20a when the door is closed. In other words, it is designed to have a length at least corresponding to the cassette width direction of slope 24. Thus, before cassette insertion, it prevents the VTR internal mechanism to be seen via the transparent part 50a of the first cassette door 50.

The second cassette door 51 is formed with an opaque material and bears a display mark 51a to indicate, for example, the manufacturer or the product name on the facade (which can be viewed from the outside of the device). The display mark 51a is provided, for example, in the area viewable from the transparent part 50a of the first cassette door 50. Thus, before cassette insertion, the display mark 51a on the second cassette door 51 can be seen through the transparent part 50a of the first cassette door 50, creating a favorable impression. At the same time, indication of the display mark 51a inside of the cassette inserting slot 37 effectively serves for guiding cassette insertion.

When a cassette is inserted, the second cassette door 51 opens in association with the first cassette door 50 and, after cassette loading, is placed on the top of the cassette 10 loaded to the cassette holder. Specifically, when the first cassette door 50 closes in the cassette loading operation, the second cassette door 51 without any energization naturally rotates to closing direction (lower direction in the figure) and comes into contact with the top of the back end of the loaded cassette 10. At this point, the back side of the second cassette door 51 is not seen from the transparent part 50a of the first cassette door 50. With the cassette completely loaded, the user sees from the transparent part 50a of the first cassette door 50, the label 11 on the loaded cassette 10 as well as the display mark 51a on the second cassette door 51 placed on the top of the cassette 10. This results in creation of an innovative design which has not been achieved before and gives a favorable impression to the user.

In the cassette ejection process, the rising of the cassette holder causes the second cassette door 51 to rotate toward the opening direction. As the cassette holder moves, the first cassette door 50 is also driven by the door's opening/closing lever so that it opens at a timing which does not obstruct the cassette ejection. By such opening of the first and the second cassette doors 50 and 51 together, the route to eject the cassette 10 is assured.

Figure 2:
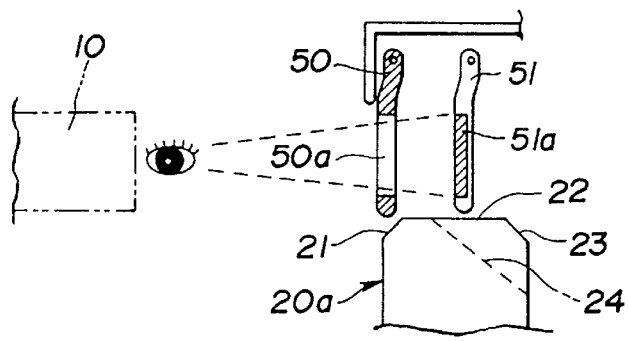
FIG. 2 is a cross sectional view to show the status of the cassette display viewer device before cassette insertion.
Figure 3:
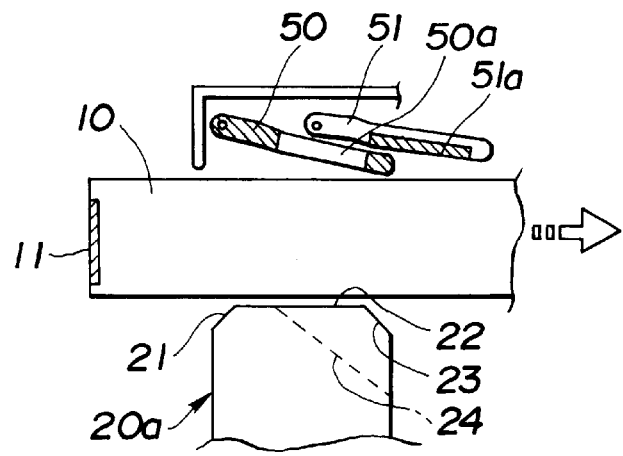
FIG. 3 is a cross sectional view to show the status of the cassette display viewer device when the cassette is inserted.
Figure 4:
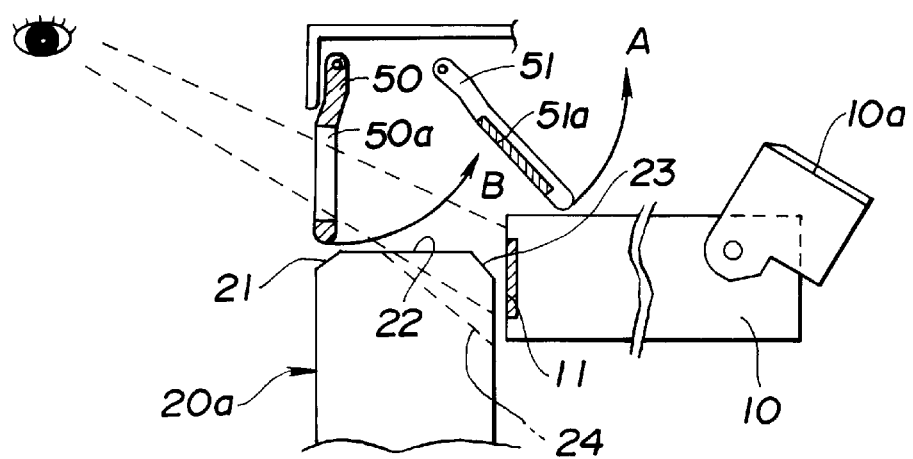
FIG. 4 is a cross sectional view to show the status of the cassette display viewer device after cassette loading.

Next, referring to the FIGS. 2 to 4, the operation of the device shown in FIG. 1 is described in details. FIGS. 2 to 4 are cross sectional views of the major parts of the device to illustrate the operation of the cassette display viewer device according to the present invention. FIG. 2 shows the position of the device before insertion of the cassette, FIG. 3 shows the position of the device when the cassette is being inserted, and FIG. 4 shows the position of the device after cassette loading. Note that these figures have the same reference numerals for the same constituent elements as those in FIG. 1.

Before cassette insertion, both of the first and the second cassette doors 50 and 51 are closed as shown in FIG. 2. Suppose the user now looks inside of the VTR from a position near the cassette inserting slot of the VTR as shown in the figure. Through the transparent part 50a of the first cassette door 50, all that the user sees is the display mark 51a on the surface of the second cassette door 51 placed at the back of the first cassette door 50. Thus, the user sees the display mark 51a only, without seeing the mechanism inside the VTR. This results in creation of an innovative design which gives a favorable impression. Further, even if the external light comes in through the transparent part 50a at this point, the second cassette door 51 obstructs such light and prevents such light from going into the VTR so that the VTR functions are not affected. At the same time, the external light illuminates the display mark 51a on the second cassette door 51 and makes the display mark 51a more conspicuous, which creates a favorable impression.

The display mark 51a seen by the user can then be used as a guide to inserting the cassette into the slot 37. Specifically, the user uses the front end of the cassette 10, as shown in FIG. 2, to press and open the first cassette door 50 where the display mark 51a is seen and then inserts the cassette 10 into the cassette inserting slot 37.

By the insertion of the cassette 10, the first cassette door 50 opens and, at the same time, the second cassette door 51 opens in association with the first cassette door 50 so that the cassette insertion route is assured as shown in FIG. 3. Then, the cassette 10 is horizontally guided by the cassette horizontal guide section 22 of the cassette guiding member 20a and stored in the cassette holder (not shown). The cassette holder which has stored the cassette 10 first moves horizontally toward the inside of the VTR and then goes down vertically to mount the cassette 10 onto the reel base (not shown). During the move of the cassette holder, the cassette door 50 is released from contact with the cassette 10 and closes the cassette inserting slot.

During this move of the cassette holder, the cassette door 51 is in contact with the top of the stored cassette 10 and keeps such contact even after the completion of cassette loading. Specifically, at this point, the second cassette door 51 is not completely closed as in FIG. 4 but stops while directing the display mark slightly downward.

Upon completion of cassette loading, suppose a user looks into the inside of the VTR from a position near the cassette inserting slot 37 of the VTR as shown in FIG. 4. In this case, without pressing and opening the first cassette door 50, the user can easily see the label 11 on the cassette 10 via the transparent part 50a of the cassette door 50 and the space above the slope 24 of the cassette guiding member 20a. Thus, the contents of the loaded cassette can be recognized at a glance. At this point, the display mark 51a on the second cassette door 51 is also seen by the user. This creates an innovative design, which generates a favorable impression to the user.

A lamp device to illuminate the inside of the device, for example, may be provided near the cassette guiding member 20a so that it illuminates the display mark 51a on the second cassette door 51 and the label 11 from a low position. With this construction, the display mark 51a will be more conspicuous and the label 11 can be more easily recognized.

As shown in FIG. 4, upon completion of cassette 10 loading, the second cassette door 51 is in contact with the top of the back end of the cassette and the space above the cassette is closed. Thus, the mechanism inside of the VTR is not seen from the transparent part 50a of the first cassette door 50. In addition, the external light is obstructed by the second cassette door 51 and the inside of the VTR is protected from lighting from outside. The above construction prevents any adverse affect of light to the VTR product performance and assures stable product performance.

In the cassette ejection process, the cassette 10 rises with the cassette holder. Then, the second cassette door 51 in contact with the cassette 10 is, by the rise of the cassette 10, completely opened with rotating in direction A (shown by arrow in the figure). As the cassette holder (not shown) moves, the first cassette door 50 is also completely opened by the door opening/closing lever (not shown) with rotating in direction B (shown by arrow in the figure). Thus, the cassette transfer route for cassette ejection is assured. Specifically, the second cassette door 51 can be automatically opened and closed in cassette insertion or cassette ejection without any special component such as a door opening/closing lever.

Then, the cassette 10 is transferred by the cassette holder on the cassette guiding member 20a and transferred to the position where its end with the label 11 is projected from the cassette insertion slot 37 so that the user can take it off, which terminates ejection. When the cassette is completely ejected, the cassette 10 and the cassette doors 50 and 51 are in the same positional relations as those in FIG. 3 and the cassette doors 50 and 51 are in contact with the top of the cassette 10 respectively.

When the user takes the cassette 10 from the VTR 20, the first and the second cassette doors 50 and 51 are closed again and return to the cassette insertion waiting position as shown in FIG. 2.

Figure 5:
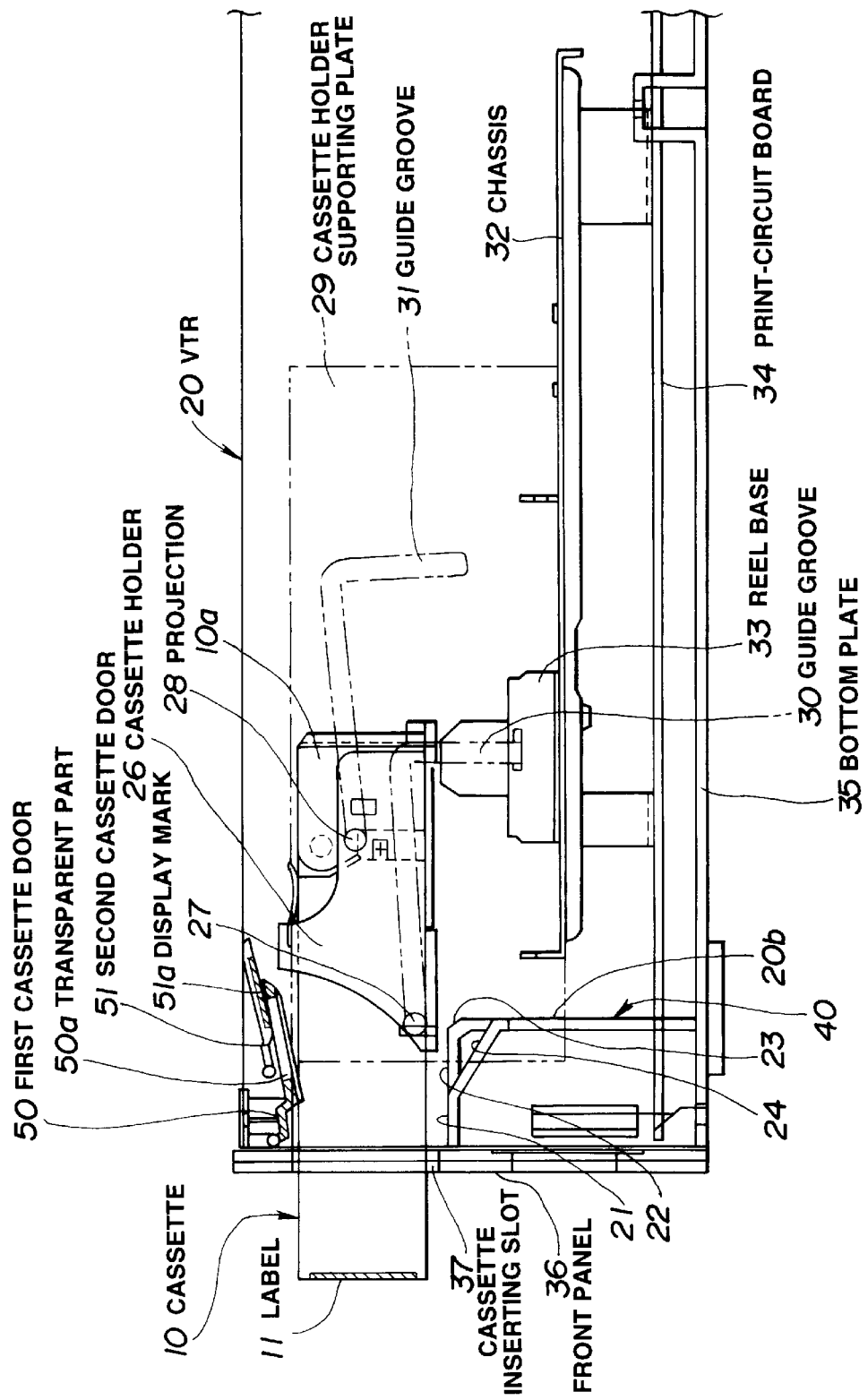
FIG. 5 is a cross sectional view to show the cassette insertion status in a specific example constructing a cassette display viewer device in a VTR.
Figure 6:
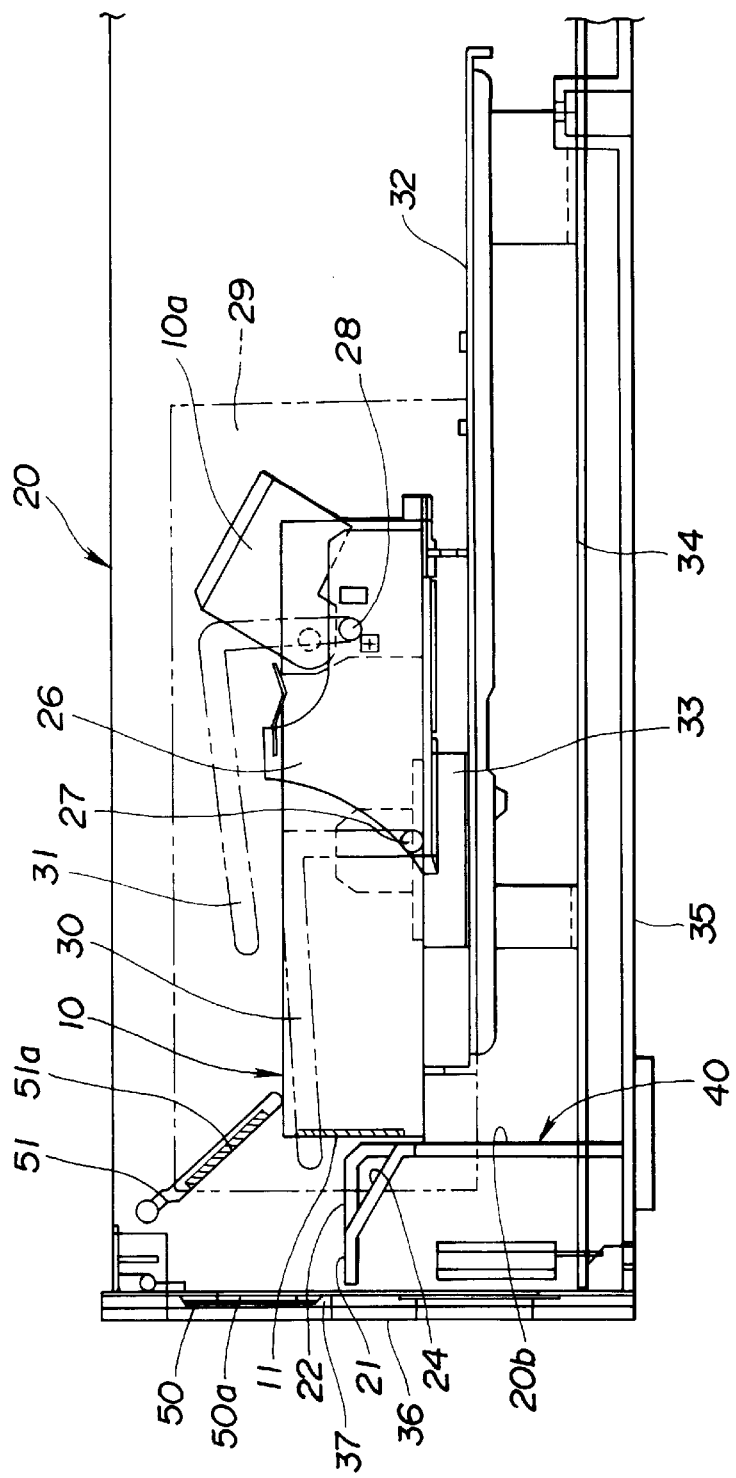
FIG. 6 is a cross sectional view to show the status after cassette loading in a specific example constructing a cassette display viewer device in a VTR.
Figure 7:
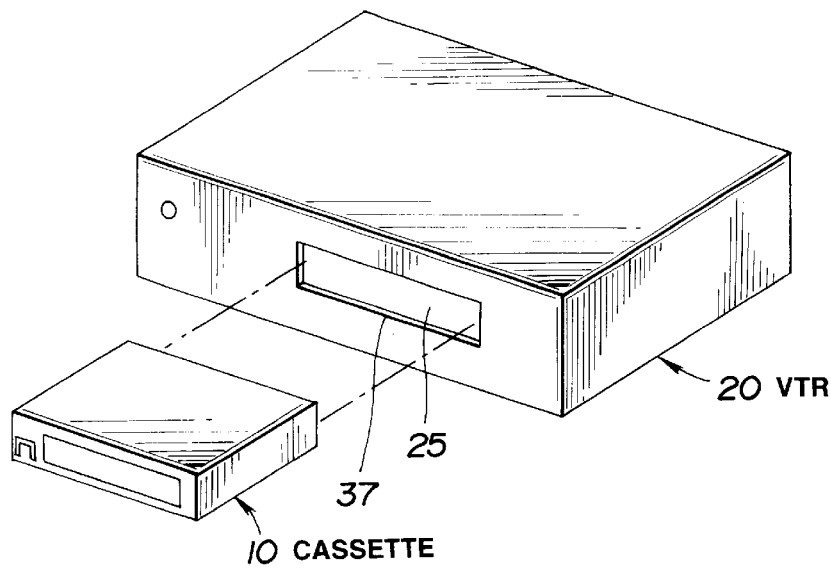
FIG. 7 is a perspective view to show the relation between the VTR and the cassette.

FIGS. 5 and 6 show a specific construction inside the VTR including a cassette holder 26. FIG. 5 shows the position in which the cassette 10 is stored in the cassette holder 26.

As shown in FIG. 5, a front panel 36 having the cassette inserting slot 37 is provided on the facade of the VTR 20 and a bottom plate 35 is located so as to support the above front panel 36.

Inside the VTR 20, there is a chassis 32 in addition to a printed circuit board 34. On the chassis 32, a cassette holder supporting plate 29 is mounted upright. The cassette holder 26 has projections 27 and 28 on its outer face which are respectively inserted into guide grooves 30 and 31 of the cassette holder supporting plate 29. The cassette holder 26 is driven by a drive mechanism (not shown) so that it moves along the guide grooves 30 and 31.

On the chassis 32 there is a reel base 33 with which the reel part of the cassette 10 is engaged. Inside the VTR, a cassette guide plate 40 constituting the cassette guiding member is mounted upright to the bottom plate 35. The cassette guiding member is made with a cassette guiding plate 40 formed to have bent sections near the cassette inserting slot 37. Specifically, the cassette guide plate 40 has cassette inserting guide sections 21, cassette horizontal guide sections 22, cassette ejecting guide sections 23 and a slope 24 along the way of the cassette transfer route at the back of the cassette inserting slot 37.

When the cassette 10 is inserted into the cassette inserting slot 37, the first cassette door 50 opens as described above, and at the same time, the second cassette door 51 also opens in association with the first cassette door 50.

The cassette holder 26 moves horizontally from the position in FIG. 5 along the guide grooves 30 and 31 of the cassette holder supporting plate 29 and then goes down vertically in the space parted by the vertical face on the inner side of the cassette guide plate 40. In this process, the first cassette door 50 is released from contact with the cassette 10 and closes the cassette inserting slot 37.

Then, as shown in FIG. 6, the cassette holder 26 loads the cassette 10 into the reel base 33 and thereby completes loading of the cassette 10. In this position, the second cassette door 51 keeps contact with the top of the cassette 10.

The lid 10a of the cassette 10 is, in the process of loading the cassette 10, unlocked by a lid lock release mechanism (not shown) and opened by a lid open mechanism (not shown).

When the cassette is ejected, the cassette opening/closing lever (not shown) opens the cassette door 50 and the cassette holder 26 transfers the cassette 10 to the ejection position. In this process, the lid 10a of the cassette 10 is closed.

In the above cassette loading position, the user can see the label 11 on the cassette 10 without pressing or opening the first cassette door 50, thanks to the slope 24 of the cassette guide plate 40 as well as the transparent part 50a of the first cassette door 50. In addition, the display mark 51a on the second cassette door 51 can be also seen through the transparent part 50a of the first cassette door 50. By providing, for example, a lighting device near the cassette guiding member inside of the VTR, the display mark 51a can be easily seen even in a dark room. This effectively serves to guide the cassette to the inserting slot 37 and also creates an innovative appearance to the product from the viewpoint of design. Further, the inside of the VTR is not seen through the transparent part 50a of the first cassette door 50, and even if the external light comes in through the transparent part 50a, the second cassette door 51 can obstruct such light and prevent deterioration of the product performance which may be caused by the light. Thereby a stable product performance is achieved.

Though the above preferred embodiment of the present invention is describe for a VTR product, application of the invention is not limited to this product. The present invention can be widely applied to electronic products which require cassette loading.

As described above, the present invention facilitates viewing of the label 11 after cassette loading by providing both a first cassette door 50 having the transparent part 50a and a second cassette door 51 bearing the display mark 51a so that the user can check and understand the contents of the loaded cassette. The second cassette door 51 solves the design problem of an unfavorable appearance caused by the internal mechanism of the VTR seen from outside when the cassette is not loaded. Further, the display mark 51a on the second cassette door 51 gives the product with an attractive appearance. Since the second cassette door 51 can be opened and closed without the need of any special part such as a door's opening/closing lever, it is not necessary to increase the number of components and the operation can more easily be stabilized.

What is claimed is:

1. A cassette display viewer device, comprising:
   a cassette bearing a label on one side,
   a housing having a cassette inserting slot and accommodating the cassette inserted via the cassette inserting slot at a predetermined position inside,
   a first cassette door provided at said cassette inserting slot which is at least partially formed with a transparent member and designed to open when said cassette is inserted and to close to cover said cassette inserting slot when said cassette is or is not contained inside of said housing and constructed to enable viewing of the label on said cassette through said transparent member part when said cassette is contained in said housing, and a second cassette door located at a position further in said housing than said first cassette door which is formed with an opaque member and designed to open together with said first cassette door when said cassette is inserted, to open up to a position in which the label on said cassette is viewable through said transparent part of said first cassette door when the cassette is at said predetermined position in said housing, and to be opposed at least to the transparent part of said first cassette door when said cassette is not in said housing.

2. A cassette display viewer device, comprising:

a cassette bearing a label on one side, an inserting slot for said cassette provided at the product housing, a cassette holder provided in said housing which accepts said cassette inserted via said cassette inserting slot with its face bearing said label faced toward the cassette inserting slot at a first position, moves horizontally and then goes down vertically to transfer said accepted cassette to a second position, that is, a predetermined position in said housing, and which rises vertically from said second position, moves horizontally and transfers said cassette to said first position, a guiding member provided between said cassette inserting slot and said cassette holder in said housing to guide said cassette to be inserted to said cassette holder at said first position having a notch so as to expose the label face of said cassette to said cassette inserting slot when said cassette holder containing said cassette is at said second position, a first cassette door provided at said cassette inserting slot which is at least partially formed with a transparent member and designed to open when said cassette is inserted and to close to cover said cassette inserting slot when said cassette is or is not contained inside of said housing and thus constructed to enable viewing of said label on said cassette through said transparent member part when said cassette holder containing the cassette is at said second position, and a second cassette door located at a position further in said housing than said first cassette door which is formed with an opaque member and designed to open together with said first cassette door when said cassette is inserted, to open up to a position in which said label on said cassette is viewable through said transparent part of said first cassette door when said cassette holder containing said cassette is at said second position, and to be opposed at least to said transparent part of said first cassette door when said cassette is not in said housing.

3. A cassette display viewer device according to claim 2, wherein said second cassette door is designed to be in contact with a top of said cassette when said cassette holder containing the cassette is at said predetermined position in said housing.

4. A cassette display viewer device according to claim 2, wherein said second cassette door is designed to be in contact with a top of said cassette when said cassette holder containing the cassette is at said second position.

5. A cassette display viewer device according to claim 1, wherein said second cassette door is bearing display or indication related to the product on its face opposed to said first cassette door.

6. A cassette display viewer device according to claim 2, wherein said second cassette door is bearing display or indication related to the product on its face opposed to said first cassette door.

7. A cassette display viewer device according to claim 1, wherein said second cassette door is bearing display with symbols or marks on its face opposed to said first cassette door.

8. A cassette display viewer device according to claim 1, wherein the transparent part area of said first cassette door is formed corresponding to the label application area on said cassette.

9. A cassette display viewer device according to claim 2, wherein the transparent part area of said first cassette door is formed corresponding to the label application area on said cassette.

10. A cassette display viewer device according to claim 2, wherein said notch in said guiding member is formed to be a slope going down toward inside of said housing.

* * * * *